(12) United States Patent
Cranch et al.

(10) Patent No.: US 9,116,304 B2
(45) Date of Patent: Aug. 25, 2015

(54) FIBER OPTIC CANTILEVER ACOUSTIC VECTOR SENSOR

(71) Applicants: Geoffrey A. Cranch, Fairfax Station, VA (US); Clay K. Kirkendall, Fairfax, VA (US)

(72) Inventors: Geoffrey A. Cranch, Fairfax Station, VA (US); Clay K. Kirkendall, Fairfax, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 179 days.

(21) Appl. No.: 13/863,551

(22) Filed: Apr. 16, 2013

(65) Prior Publication Data

US 2013/0272645 A1    Oct. 17, 2013

Related U.S. Application Data

(60) Provisional application No. 61/624,550, filed on Apr. 16, 2012.

(51) Int. Cl.

| | |
|---|---|
| *G02B 6/34* | (2006.01) |
| *G01L 11/02* | (2006.01) |
| *G01H 9/00* | (2006.01) |
| *G02B 6/02* | (2006.01) |
| *G01D 5/353* | (2006.01) |

(52) U.S. Cl.
CPC .............. *G02B 6/34* (2013.01); *G01H 9/004* (2013.01); *G01L 11/025* (2013.01); *G01D 5/35316* (2013.01); *G02B 6/022* (2013.01)

(58) Field of Classification Search
None
See application file for complete search history.

(56) References Cited

U.S. PATENT DOCUMENTS

2006/0011820 A1 *   1/2006   Chow-Shing et al.   ... 250/227.14

OTHER PUBLICATIONS

Binzhen Zhang et al., Modeling and characterization of a micromachined artificial hair cell vector hydrophone, Microsystem Technologies, 2008, p. 821-828, vol. 14, Springer-Verlag.
Michel A. Josserand et al., PVF2 velocity hydrophones, J. Acoust, Soc. Am., Sep. 1985, p. 881-867, vol. 78, No. 3, Acoustical Society of America.
Linxian Liu et al., Design of a novel MEMS Resonant-column Type Bionic Vector Hydrophone, Computing, Measurement, Control and Sensor Network (CMCSK), 2012 International Conference on, Jul. 2012, p. 179-182, IEEE.

* cited by examiner

*Primary Examiner* — Jerry Rahll
(74) *Attorney, Agent, or Firm* — US Naval Research Laboratory; Suresh Koshy

(57) ABSTRACT

A planar or cylindrical, cantilever-type apparatus including a rigid support. The apparatus further includes a first optical fiber connected to the rigid support, the first optical fiber including a first neutral axis and at least one first wave-guiding core running parallel to the first neutral axis and located at a distance from the first neutral axis, each of the at least one first wave-guiding core including at least one first reflector. The apparatus further includes a first membrane surrounding the first optical fiber; and a first liquid inside the first membrane and surrounding the first optical fiber, the first liquid including a Reynolds number less than one.

16 Claims, 9 Drawing Sheets

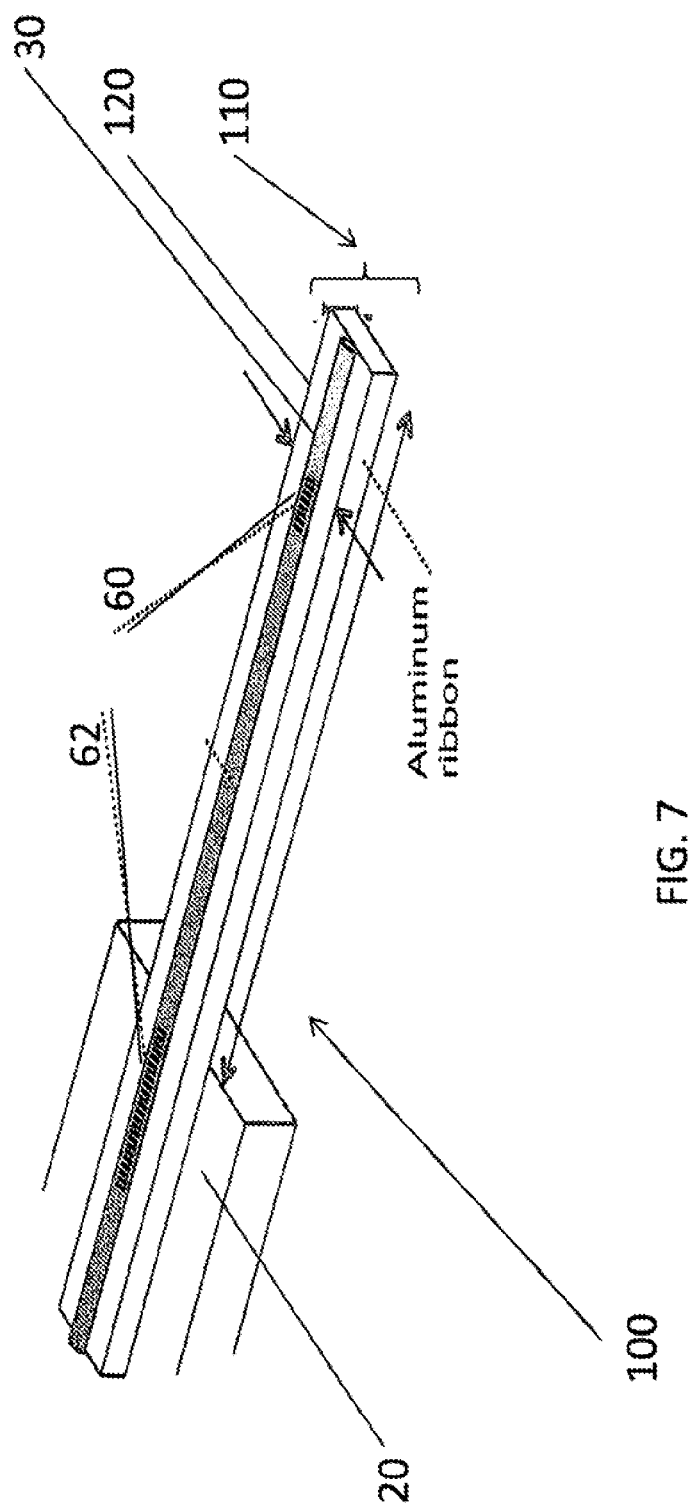

FIBER OPTIC CANTILEVER ACOUSTIC VECTOR SENSOR

CROSS REFERENCE TO RELATED APPLICATIONS

The present application claims priority U.S. Provisional Patent Application Ser. No. 61/624,550 filed 16 Apr. 2012.

FIELD OF THE INVENTION

The invention relates generally to fiber optic laser sensors, and more particularly to fiber optic acoustic vector sensors.

BACKGROUND OF THE INVENTION

The benefits of characterizing an acoustic field by measuring particle motion, instead of local changes in ambient a pressure, have long been known. Measurement of the particle motion in terms of displacement, velocity or acceleration reveal information on the field direction as well as amplitude. Simultaneous measurement of the local pressure, p, and particle velocity, $\dot{u}$, in a plane wave also yields the acoustic intensity through the relationship, $I = <\text{real}(p)\text{real}(\dot{u})>_T$, where $<>_T$ denotes time average. Here, u, is particle displacement and $\dot{u}$ denotes differentiation with respect to time. When it is of interest to detect and locate sources of acoustic radiation through the use of coherently beamformed arrays, particle motion sensors provide further benefits due to their inherent directionality. An array of three-axis directional sensors achieves equal array gain to an array of scalar hydrophones with twice the length. Furthermore, the left-right ambiguity arising from the symmetry of scalar sensor line arrays is overcome with arrays of directional sensors.

Most sensors designed to respond to acoustic particle motion are based on some form of simple harmonic mechanical oscillator that is driven by the acoustically induced motion. The operating bandwidth of the sensor is determined by the fundamental resonant frequency of the oscillator. Assuming the sensor responds linearly to the relative displacement between the inertial mass and its case, then operation below the fundamental resonance will result in a response to acceleration independent of frequency (i.e. an accelerometer). Operation above the fundamental resonance results in a response to displacement independent of frequency. One such sensor, known as the moving coil geophone, that operates above the fundamental resonance responds to the rate of change of the sensor casing and thus responds to velocity independent of frequency.

For measuring low frequency (i.e. <10 kHz) acoustic fields in the ocean, a frequency independent or smooth response to particle velocity is highly desirable. In a planar wave field, the acoustic impedance relating the ratio of the pressure to particle velocity is given by the product of fluid density and sound speed, $\rho_{fl} c_{fl}$. Thus, the ambient velocity noise field is proportional to the pressure field. This is beneficial since the spectral density of the ambient acoustic pressure noise exhibits an approximately, $1/f^7$ dependence, which is a similar dependence to the internal electronic noise spectrum in many sensors, particularly at low frequencies. Consequently, when the limiting noise source is ambient acoustic, the acoustic resolution is not diminished for deceasing frequency with a true velocity sensor. The interest in developing low frequency vector sensors is apparent from the number of reported devices. For example, devices based on moving coil, piezoelectric, resistive heating, and magnetostrictive mechanisms have been demonstrated as well as several fiber-optic devices based on pressure gradient hydrophones. However, achieving high acoustic sensitivity over a large bandwidth from a small sensor remains a challenge.

BRIEF SUMMARY OF THE INVENTION

An embodiment of the invention includes a cylindrical, cantilever-type apparatus including a rigid support. The apparatus further includes a first optical fiber connected to the rigid support, the first optical fiber including a first neutral axis and at least one first wave-guiding core running parallel to the first neutral axis and located at a distance from the first neutral is each of the at least one first wave-guiding core including at least one first reflector. The apparatus further includes a first membrane surrounding the first optical fiber; and a first liquid inside the first membrane and surrounding the first optical fiber, the first liquid including a Reynolds number less than one.

Optionally, the apparatus further includes a second optical fiber connected to the rigid support, the second optical fiber being oriented perpendicular to the first optical fiber the second optical fiber including a second neutral axis and at least one second wave-guiding core running parallel to the second neutral axis and located at a distance from the second neutral axis, each of the at least one second wave-guiding core including at least one second fiber Bragg grating. Optionally, the apparatus further includes a third optical fiber connected to the rigid support, the third optical fiber being oriented perpendicular to the first optical fiber and parallel to the second optical fiber, the third optical fiber including a third neutral axis and at least one third wave-guiding core running parallel to the third neutral axis and located at a distance from the third neutral axis, each of the at least one third wave-guiding core including at least one third fiber Bragg grating. Optionally, the at least one first wave-guiding core includes one of one first wave-guiding core, two first wave-guiding cores, three first wave-guiding cores, and four first wave-guiding cores.

Optionally, the first optical fiber includes a neutral plane, wherein the at least one first optical fiber includes two first wave-guiding cores, one of the two first wave-guiding cores including a length lying in the neutral plane and the other of the two first wave-guiding cores including a length free of intersection with the neutral plane and lying parallel to the neutral plane.

Optionally, the apparatus further includes a second membrane surrounding the second optical fiber; and a second liquid inside the second membrane and surrounding the second optical fiber, the second liquid including a Reynolds number less than one.

Optionally, the apparatus further includes a third membrane surrounding the third optical fiber; and a third liquid inside the third membrane and surrounding the third optical fiber, the third liquid including a Reynolds number less than one.

Optionally, the first membrane surrounds the second optical fiber and the third optical fiber.

Optionally, the first membrane surrounds the second optical fiber.

Optionally, the first membrane surrounds the third optical fiber.

Optionally, the first optical fiber includes one of an erbium-doped fiber, an ytterbium-doped fiber, a thulium-doped fiber, and a praseodymium-doped fiber.

Optionally, the third optical fiber includes one of an erbium-doped fiber, an ytterbium-doped fiber, a thulium-doped fiber, and a praseodymium-doped fiber.

Optionally, the at least one first reflector includes to fiber Bragg grating and a mirror, wherein the fiber Bragg grating is located proximate to where the first optical fiber is connected to the rigid support and the mirror is located proximate to an end at the first optical fiber distal to the rigid support.

Optionally, the at least one first reflector includes a fiber Bragg grating, and a thin film reflector, wherein the fiber Bragg grating is located proximate to where the first optical fiber is connected to the rigid support and the thin film reflector is located proximate to an end of the first optical fiber distal to the rigid support.

Optionally, the at least one first reflector includes a first fiber Bragg grating, and a second fiber Bragg grating, wherein the first fiber Bragg grating is located proximate to where the first optical fiber is connected to the rigid support and the second fiber Bragg grating is located proximate to an end of the first optical fiber distal to the rigid support.

Another embodiment of the invention includes a planar, cantilever-type apparatus including a rigid support. The apparatus further includes a first cantilever, which in turn includes a first optical fiber and a first rigid ribbon. The first optical fiber and the first ribbon together include a first neutral surface. The first optical fiber is connected to the rigid support, the first optical fiber including at least one first wave-guiding core running parallel to the first neutral surface, each of the at least one first wave-guiding core including at least one first reflector, the first rigid ribbon being affixed to the first optical fiber and to the first rigid support. The apparatus further includes a first membrane surrounding the first cantilever. Optionally, the rigid ribbon includes a metal or plastic. Optionally, the metal includes aluminum, steel, copper, or brass.

Optionally, the apparatus further includes a second cantilever including a second optical fiber and a second rigid ribbon. The second optical fiber and the second ribbon together include a second neutral surface. The second optical fiber is connected to the rigid support, the second optical fiber and said second ribbon being oriented perpendicular to the first optical fiber and the first ribbon, the second optical fiber including at least one second wave-guiding core running parallel to the second neutral surface and located at a distance from the second neutral surface, each of the at least one second wave-guiding core including at least one second fiber Bragg grating, the second rigid ribbon being affixed to the second optical fiber and to the rigid support.

Optionally, the apparatus further includes a third cantilever including a third optical fiber and a third rigid ribbon. The third optical fiber and the third ribbon together include a third neutral surface. The third optical fiber is connected to the rigid support, the third optical fiber and the third ribbon being oriented perpendicular to the first optical fiber and the first ribbon (i.e., the first cantilever) and parallel to the second optical fiber and the second ribbon (i.e., the second cantilever), the third optical fiber including at least one third wave-guiding core running parallel to the third neutral surface and located at a distance from the third neutral surface, each of the at least one third wave-guiding core including at least one third fiber Bragg grating, the third rigid ribbon being affixed to the third optical fiber and to the rigid support.

Optionally, the first membrane surrounds the second cantilever and the third cantilever. Optionally, the apparatus further includes a second membrane surrounding the second cantilever; and a third membrane surrounding the third cantilever.

Optionally, the at least one first reflector includes at least one fiber Bragg grating and a mirror, wherein the at least one first reflector is located one of proximate to where the first optical fiber is connected to the rigid support and proximate to an end of the first optical fiber distal to the rigid support.

Optionally, the at least one first reflector includes at least one fiber Bragg grating, and at least one thin film reflector, wherein the at least one first reflector is located one of proximate to where the first optical fiber is connected to the rigid support and proximate to an end of the first optical fiber distal to the rigid support.

Optionally, the at least one first reflector includes a first fiber Bragg grating, and a second fiber Bragg grating, wherein the first fiber Bragg grating is located proximate to where the first optical fiber is connected to the rigid support and the second fiber Bragg grating is located proximate to an end of the first optical fiber distal to the rigid support.

An embodiment of the instant invention includes a particle motion sensor. The sensor is based on the acoustically driven motion of a fluid loaded fiber-optic cantilever. Both cylindrical and planar cantilevers are investigated. Although, essentially behaving as a driven mechanical oscillator, the implementation of the sensing mechanism results in unique behavior that is evidently well suited to measurement of low frequency acoustic fields. Novel aspects of this embodiment include: (a) the dominant damping mechanism for both planar and cylindrical fiber-optic cantilever geometries is identified and incorporated into a theoretical model, (b) expressions for the acoustically induced driving force are derived for both cylindrical and planar cantilevers and their validity has been demonstrated with a finite element model, (c) the analytical model is used to determine important design parameters for an acoustic sensor, and (d) compelling evidence is presented to suggest that acoustically insonified optical fiber in a fluid exhibits a response strongly affected by the particle motion, which in certain circumstances may dominate the response due to hydrostatic pressure changes. Inertial and viscous effects are shown to be very significant using the instant embodiment.

The deflections of the cantilever are measured with a fiber laser sensor. This fiber optic sensor provides very high sensitivity to axial strain induced in the core through flexure of the optical fiber, necessary for acoustic measurements. Along with the established benefits of fiber optic sensors for undersea acoustic measurements such as excellent long term reliability, low weight and immunity to electromagnetic interference, an acoustic vector sensor based on the present concept has a many other favorable attributes: (a) it can be made very small and lightweight since the fiber constitutes both the mechanical oscillator and the sensor, (b) a single multicore fiber can potentially measure two vector components of the acoustic field, and (c) a smooth response to particle velocity can be achieved due to significant viscous fluid damping arising from low Reynolds number flow around a small cantilever.

BRIEF DESCRIPTION OF THE DRAWINGS

FIG. 7 is a perspective view of a planar, cantilever-type embodiment of the instant invention.

DETAILED DESCRIPTION OF THE INVENTION

Figure 1:
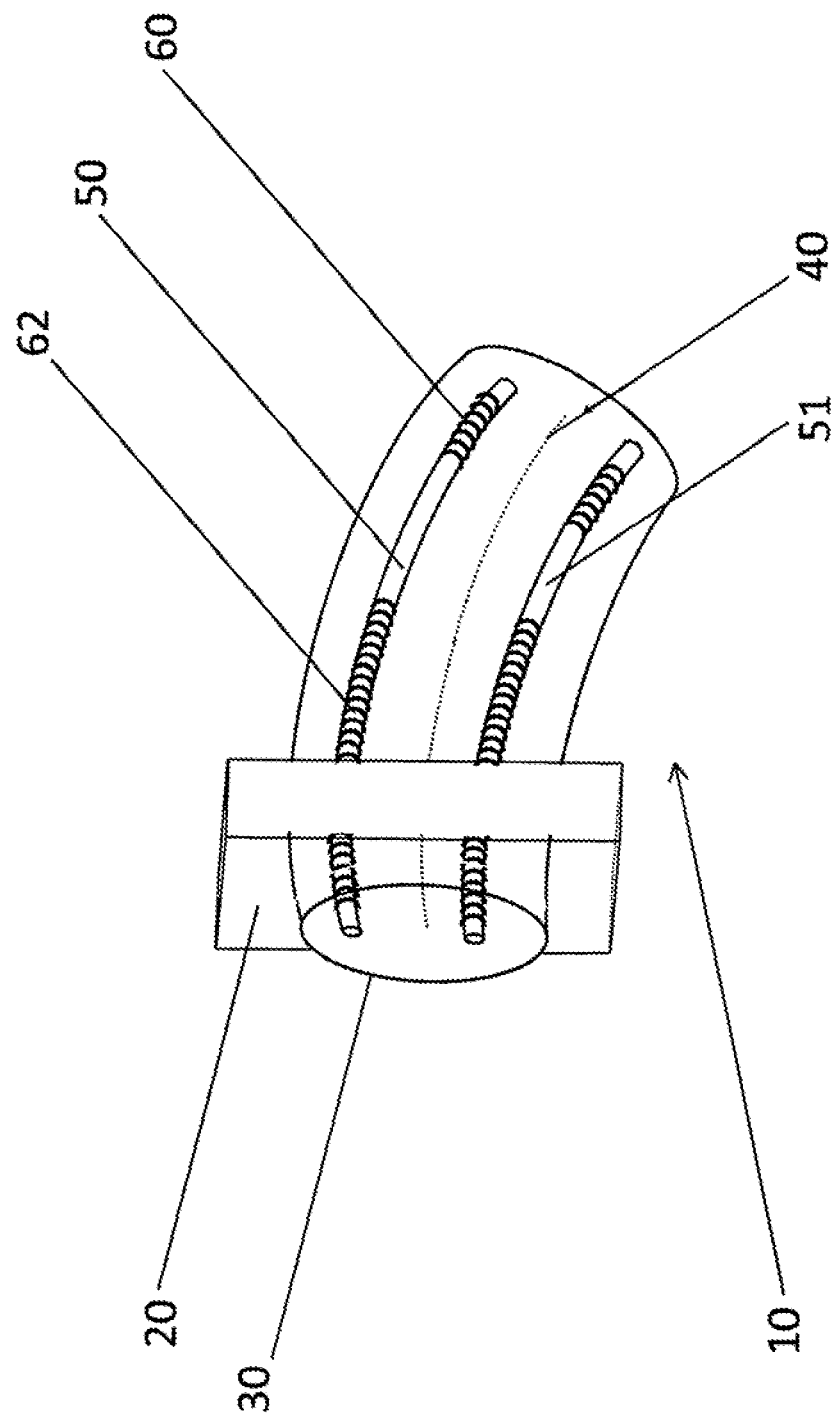
FIG. 1 is a perspective drawing view of a cylindrical, cantilever-type embodiment of the instant invention.

As shown by way of illustration in FIGS. 1-5 and 6A-C, an embodiment of the invention includes a cylindrical, cantilever-type apparatus 10 including a rigid support 20. The cylindrical, cantilever-type apparatus 10 further includes a first optical fiber 30 connected to the rigid support 20, the first optical fiber including a first neutral axis 40 and at least one first wave-guiding core 50 running parallel to the first neutral axis and located at a distance from the first neutral axis, each of the at least one first wave-guiding core 50 including at least one first reflector 60, 62. The cylindrical, cantilever-type apparatus 10 further includes a first membrane 70 surrounding the first optical fiber 30; and a first liquid 80 inside the first membrane 70 and surrounding the first optical fiber 30, the first liquid including a Reynolds number less than one.

For example, the first optical fiber 30 is embedded in the rigid support 20, as shown by way of illustration in FIG. 1. Alternatively, the first optical fiber 30 is attached to an exterior of the rigid support 20, as shown by way of illustration in FIG. 4.

For example, the rigid support 20 is made of metal, plastic, or glass. Examples of usable metals include aluminum, steel, copper, and brass.

Figure 3:
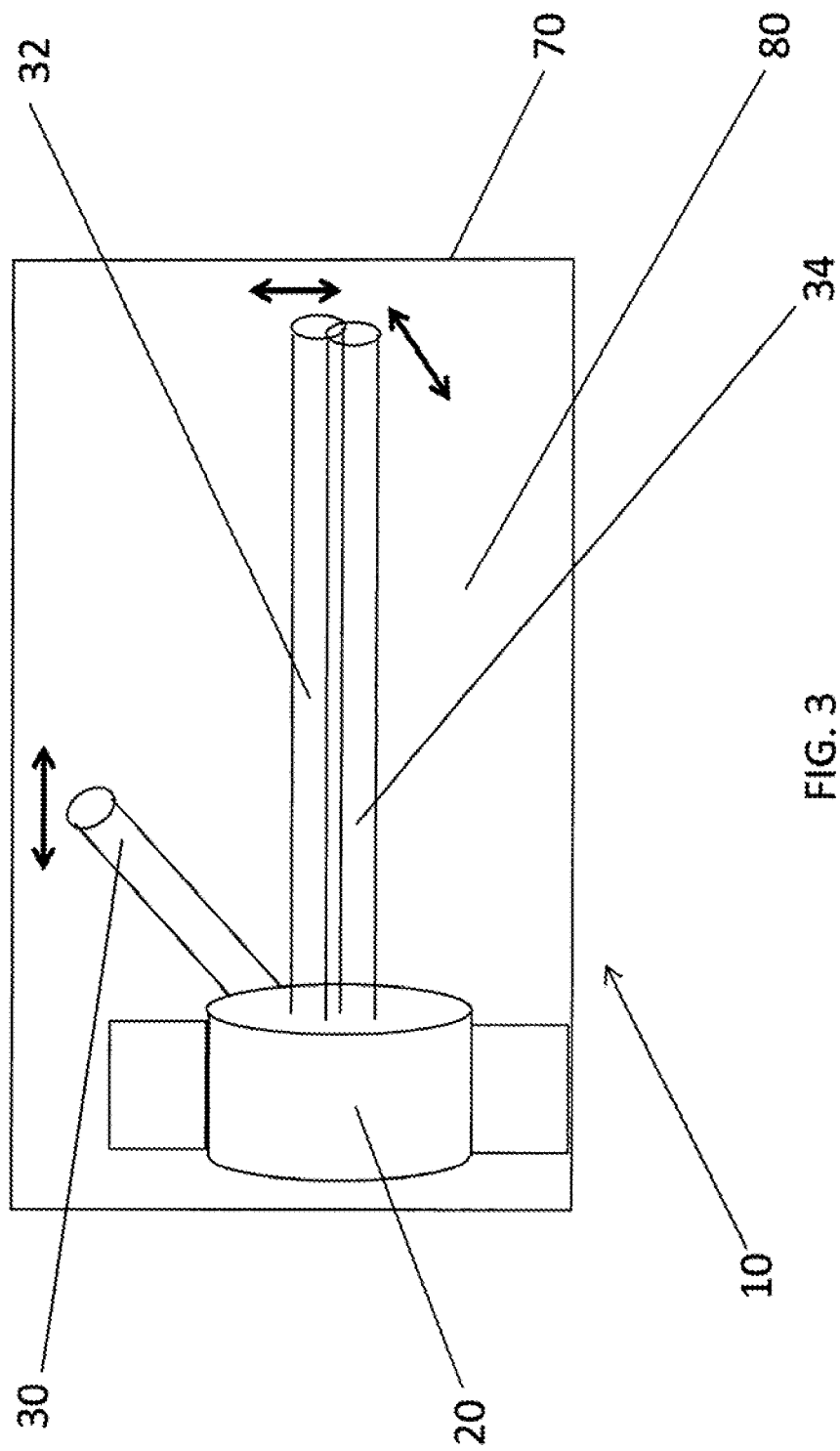
FIG. 3 is a section view of an embodiment of the instant invention, showing an illustrative placement of an illustrative membrane around more than one optical fiber.
Figure 4:
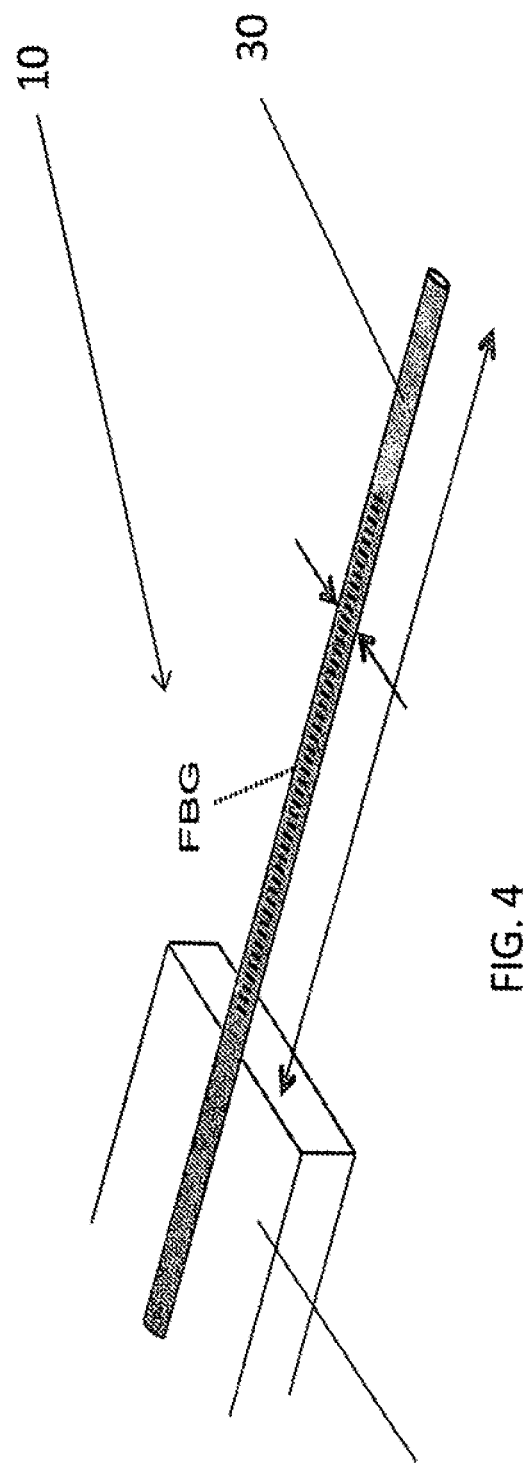
FIG. 4 is a perspective view of a cylindrical, cantilever-type embodiment of the instant invention.

Optionally, as shown by way of illustration in FIG. 3, the cylindrical, cantilever-type apparatus 10 further includes a second optical fiber 32 connected to the rigid support 20, the second optical fiber being oriented perpendicular to the first optical fiber 30, the second optical fiber including a second neutral axis and at least one second wave-guiding core running parallel to the second neutral axis and located at a distance from the second neutral axis, each of the at least one second wave-guiding core including at least one second fiber Bragg grating.

Optionally, as shown by way of illustration in FIG. 3, the cylindrical, cantilever-type apparatus 10 further includes a third optical fiber 34 connected to the rigid support 20, the third optical fiber being oriented perpendicular to the first optical fiber 30 and parallel to the second optical fiber 32, the third optical fiber including a third neutral axis and at least one third wave-guiding core running parallel to the third neutral axis and located at a distance from the third neutral axis, each of the at least one third wave-guiding core including at least one third fiber Bragg grating.

Optionally, as shown by way of illustration in FIGS. 1, 4, 5, and 6A-C, the at least one first wave-guiding core includes one of one first wave-guiding core 50, two first wave-guiding cores 50, 51, three first wave-guiding cores 52, 53, 54, and four first wave-guiding cores 55, 56, 57, 58.

Figure 5:
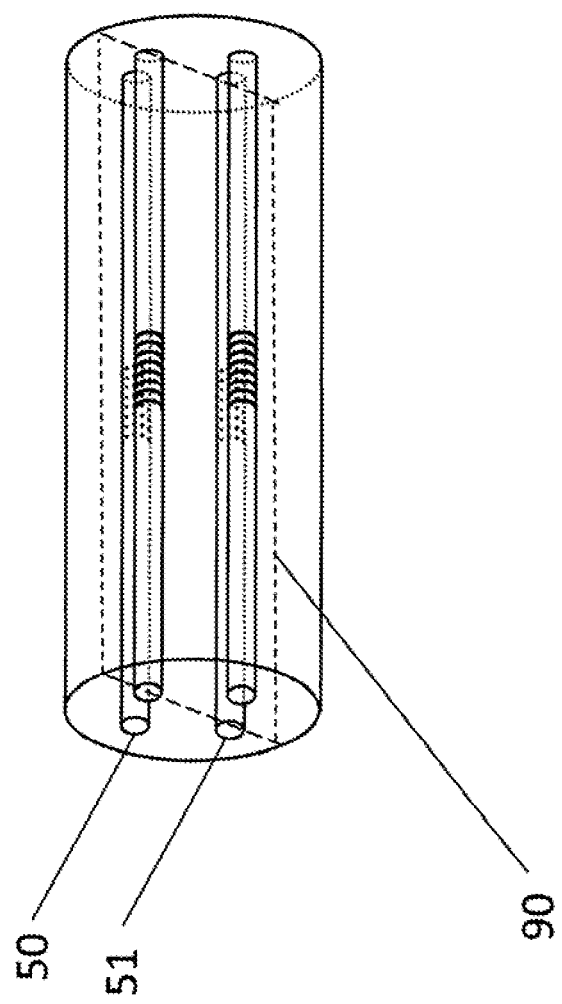
FIG. 5 is a perspective view of a cylindrical, cantilever-type embodiment of the instant invention.
Figure 6C:
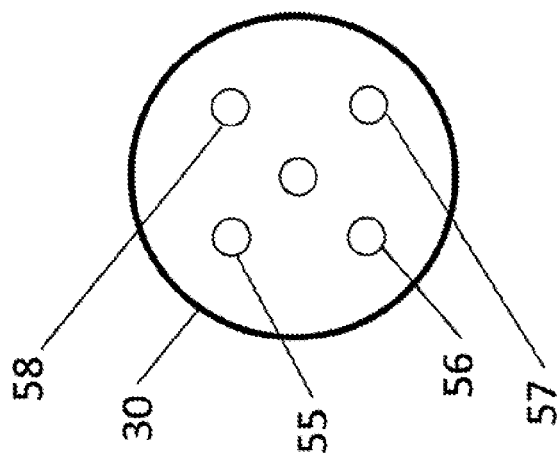
FIGS. 6A, 6B, and 6C are section views of an optical fiber according to the instant invention having three, four, and four operative wave-guiding cores, respectively.
Figure 6B:
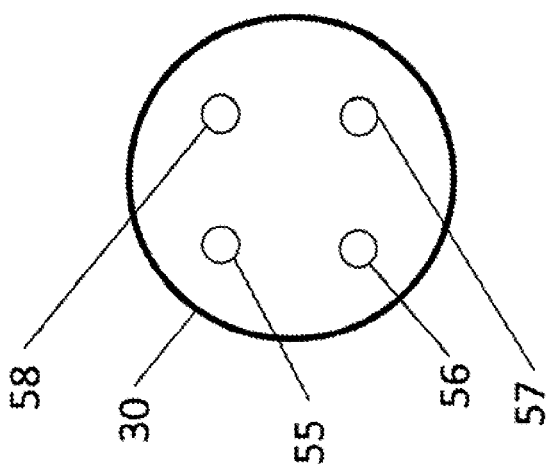
Figure 6A:
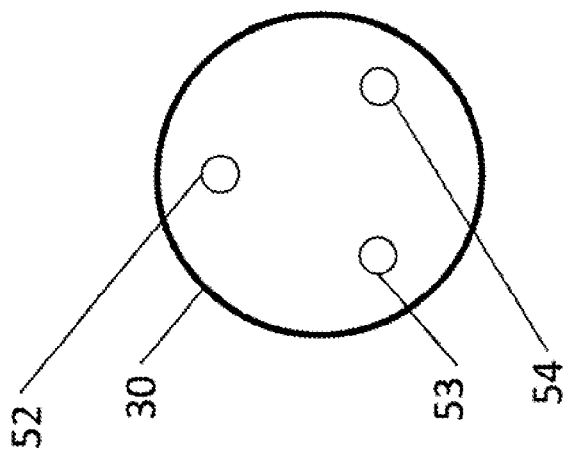

Optionally, as shown by way of illustration in FIG. 5, the first optical fiber 30 includes a neutral plane 90, wherein the at least one first optical fiber includes two first wave guiding cores 50, 51, one of the two first wave-guiding cores including a length lying in the neutral plane and the other of the two first wave-guiding cores including a length free of intersection with the neutral plane and lying parallel to the neutral plane.

Optionally, the cylindrical, cantilever-type apparatus 10 further includes a second membrane surrounding the second optical fiber; and a second liquid inside the second membrane and surrounding the second optical fiber, the second liquid including a Reynolds number less than one.

Optionally, the cylindrical, cantilever-type apparatus 10 further includes a third membrane surrounding the third optical fiber; and a third liquid inside the third membrane and surrounding the third optical fiber, the third liquid including a Reynolds number less than one.

Optionally, the first membrane 70 surrounds the second optical fiber 32 and the third optical fiber 34.

Optionally, the first membrane surrounds the second optical fiber.

Optionally, the first membrane surrounds the third optical fiber.

Optionally, the first optical fiber includes one of an erbium-doped fiber, an ytterbium-doped fiber, a thulium-doped fiber, and a praseodymium-doped fiber.

Optionally, the third optical fiber includes one of an erbium-doped fiber, an ytterbium-doped fiber, a thulium-doped fiber, and a praseodymium-doped fiber.

Optionally, the at least one first reflector includes a fiber Bragg grating 62 and a mirror, wherein the fiber Bragg grating is located proximate to where the first optical fiber 30 is connected to the rigid support 20 and the mirror is located proximate to an end of the first optical fiber distal to the rigid support.

Optionally, the at least one first reflector 60, 62 includes a fiber Bragg grating 62, and a thin film reflector, wherein the fiber Bragg grating is located proximate to where the first optical fiber 30 is connected to the rigid support 20 and the thin film reflector is located proximate to an end of the first optical fiber distal to the rigid support.

Optionally, the at least one first reflector 60, 62 includes a first fiber Bragg grating 62, and a second fiber Bragg grating, wherein the first fiber Bragg grating is located proximate to where the first optical fiber 30 is connected to the rigid support 20 and the second fiber Bragg grating is located proximate to an end of the first optical fiber distal to the rigid support.

In an illustrative embodiment of the cylindrical, cantilever-type apparatus 10, the apparatus is 55 mm in length and consists of a 125 µm diameter erbium-doped silica fiber with a 62.5 µm thick acrylate coating. A fiber laser consisting of a 50 mm Bragg grating with a centrally located pi phase-shift is formed in the core of the optical fiber. This type of laser is known as a distributed feedback ("DFB") laser and exhibits an optical mode tightly confined about the phase-shift. The Bragg grating strength is characterized by its coupling coefficient, q, which is ~180 m$^{-1}$. The phase-shift defines the center of the laser mode and is located close to the center of the cantilever.

The lasers are pumped with 100 mW of 980 nm optical radiation from a laser diode and emit a single optical frequency around 1550 nm. The frequency shifts of the fiber laser are measured using, for example, an unbalanced fiber-optic interferometer.

Figure 8:
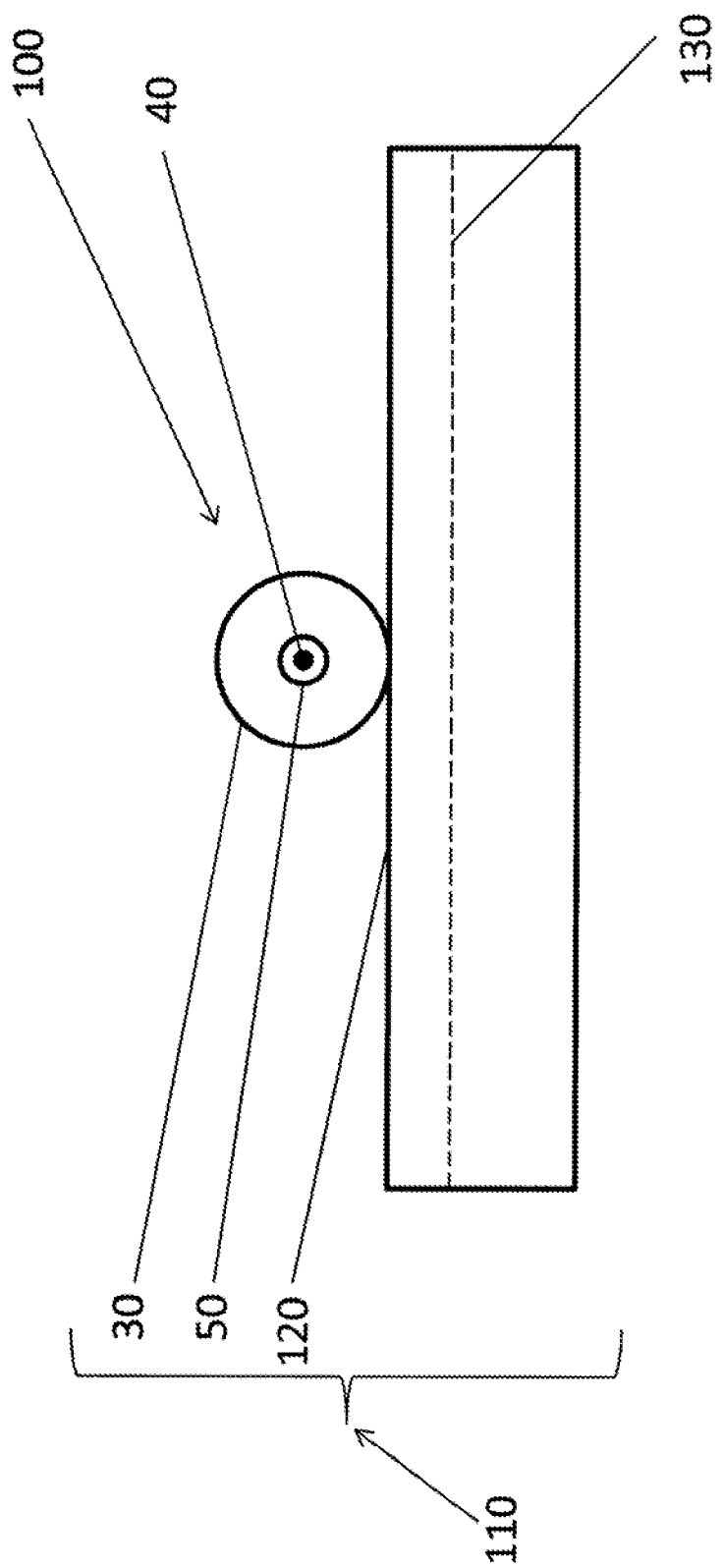
FIG. 8 is a section view of a planar, cantilever-type embodiment of the instant invention.
Figure 9:
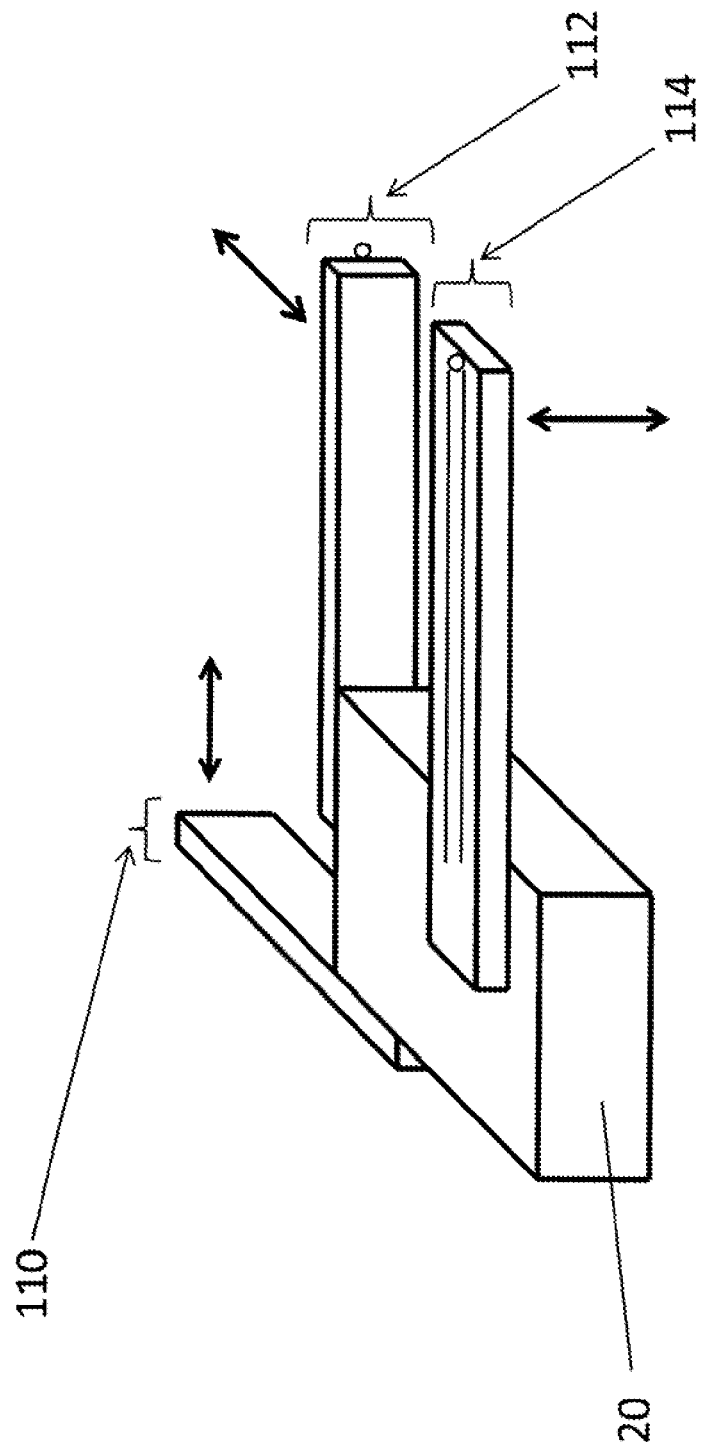
FIG. 9 is a perspective view of a planar, cantilever-type embodiment of the instant invention having more than one cantilever.

As shown by way of illustration in FIGS. 7-9, another embodiment of the invention includes a planar, cantilever-type apparatus 100 including a rigid support 20. The planar, cantilever-type apparatus 100 further includes a first cantilever 110, which in turn includes a first optical fiber 30 and a first rigid ribbon 120. The first optical fiber 30 and the first ribbon 120 together include a first neutral surface 130. The first optical fiber is connected to the rigid support, the first optical fiber including at least one first wave-guiding core 50 running parallel to the first neutral surface, each of the at least one first wave-guiding core including at least one first reflector 60,62, the first rigid ribbon being affixed to the first optical fiber and to the first rigid support. The planar, cantilever-type apparatus 100 further includes a first membrane 70 surrounding the first cantilever 110.

Optionally, the rigid ribbon 120 is made of metal, plastic, or glass. Optionally, the metal includes aluminum, steel, copper, or brass.

Optionally, as shown by way of illustration in FIG. 9, the apparatus further includes a second cantilever including a second optical fiber and a second rigid ribbon. The second optical fiber and the second ribbon together include a second neutral surface. The second optical fiber is connected to the rigid support, the second optical fiber and said second ribbon being oriented perpendicular to the first optical fiber and the first ribbon, the second optical fiber including at least one second wave-guiding core running parallel to the second neutral surface and located at a distance from the second neutral surface, each of the at least one second wave-guiding core including at least one second fiber Bragg grating, the second rigid ribbon being affixed to the second optical fiber and to the rigid support.

Optionally, as shown by way of illustration in FIG. 9, the apparatus further includes a third cantilever 114 including a third optical fiber and a third rigid ribbon. The third optical fiber and the third ribbon together include a third neutral surface. The third optical fiber is connected to the rigid support, the third optical fiber and the third ribbon being oriented perpendicular to the first optical fiber and the first ribbon (i.e., the first cantilever 110) and parallel to the second optical fiber and the second ribbon (i.e., the second cantilever 112), the third optical fiber including at least one third wave-guiding core running parallel to the third neutral surface and located at a distance from the third neutral surface, each of the at least one third wave-guiding core including at least one third fiber Bragg grating, the third rigid ribbon being affixed to the third optical fiber and to the rigid support.

Optionally, the at least one first reflector 60, 62 includes at least one fiber Bragg grating 62 and a mirror, wherein the at least one first reflector is located one of proximate to where the first optical fiber is connected to the rigid support and proximate to an end of the first optical fiber distal to the rigid support.

Optionally, the at least one first reflector 60, 62 includes at least one fiber Bragg grating 62, and at least one thin film reflector, wherein the at least one first reflector is located one of proximate to where the first optical fiber is connected to the rigid support and proximate to an end of the first optical fiber distal to the rigid support.

Optionally, the at least one first reflector 60, 62 includes a first fiber Bragg grating 62, and a second fiber Bragg grating, wherein the first fiber Bragg grating is located proximate to where the first optical fiber is connected to the rigid support and the second fiber Bragg grating is located proximate to an end of the first optical fiber distal to the rigid support.

In an illustrative embodiment of the planar cantilever-type apparatus 100, the apparatus is 40 mm in length and consists of an aluminum ribbon with crosssection 3 mm×50 µm. It comprises a fiber laser adhered to an aluminum ribbon using a thin layer of rapid cure epoxy. The fiber laser comprises two fiber Bragg gratings separated by 20 mm written into an erbium-doped fiber. Only the cavity of the laser (~20 mm in length) is adhered to the ribbon, which is positioned at the base of the cantilever, to avoid distortion of the Bragg gratings. The fiber comprises a 125 µm silica cladding with a 138 µm thick acrylate jacket. The core is approximately 200 µm from the neutral surface of the cantilever. Alternatively, the fiber laser is coated with a thin layer of metal, such as gold, and soldered to the metal ribbon.

Illustrative Methods of Using the Instant Cantilever-Type Apparatuses

Measurement of acoustic fields in water is commonly achieved using hydrophones, which respond to the associated variation in local pressure. Acoustic fields comprise both particle motion and local pressure fluctuations related though the linearized Euler equation, $\rho_w \ddot{u} = -\nabla p$, where u is the particle displacement, $\rho_w$ is the fluid density, p is the acoustic pressure, and $\nabla$ is the Del operator. Measurement of the particle displacement thus provides the field amplitude as well as direction.

It is useful to define the terminology used to refer to different types of particle motion sensor. Particle motion can be described by its displacement, u, velocity, $\dot{u}$, or acceleration, $\ddot{u}$. For simple harmonic motion ("SHM") of the form $u = u_0 \exp(-i\omega t)$ where $\omega$ is the angular frequency, these three quantities are related by $\ddot{u} = -i\omega \dot{u} = -\omega^2 u$, where $i = \sqrt{-1}$. The sensor designation is determined by whether it responds independently of frequency to one of these quantities.

Although accelerometers used as acoustic sensors suffer from diminishing acoustic sensitivity with decreasing frequency. Applicants have appreciated that one way to mitigate this is to measure particle velocity, which in a plane wave, is related to the acoustic pressure independent of frequency. In illustrative embodiments of the cylindrical cantilever-type apparatuses, the following assumptions are made:

(a) the cross section of the cantilever is uniform along its length,
(b) the cantilever length greatly exceeds its width or diameter (i.e. it is long and slender),
(c) the beam is isotropic in the x-direction,
(d) the smallest dimension of the beam greatly exceeds the amplitude of the vibration,
(e) the shortest wavelength of the acoustic excitation greatly exceeds the largest dimension of the beam, and
(f) the surrounding fluid is unbounded within a region much larger than the largest cross-sectional dimension of the cantilever Furthermore, the laser is assumed to respond only to flexural vibration modes, thus transverse modes (in the z-direction) are neglected.

Of particular interest is the effect of viscous fluid damping on the response of the cantilever which becomes significant at low Reynolds number. The Reynolds number for the acoustically induced flow can be defined in terms of the dominant length scale of the cantilever as, $$Re = \frac{\rho_{fl} \omega b^2}{4\eta} \quad (1)$$

Here $\rho_{fl}$ is the fluid density, $\omega$ is the acoustic (angular) frequency, $\eta$ is the dynamic viscosity of the fluid and b is the width of the planar cantilever or outer diameter of the cylindrical cantilever. The relative importance of viscous effects on the sensor behavior will therefore depend on operating frequency due to the dependence of Re on $\omega$.

Beam Theory

The following discussion examines the case where the fluid in which apparatuses 10, 100 is viscous. Radiation losses in the current apparatuses are expected to be small due to the acoustic wavelength greatly exceeding the cantilever dimensions.

The deflections of the cantilever when submerged in a viscous fluid are described by the beam equation, $$EI\frac{\partial^4 u(x,t)}{\partial x^4} + \mu\frac{\partial^2 u(x,t)}{\partial t^2} = f_h(x,t) \quad (2)$$

where EI is the beam stiffness, u(x, t) is the absolute displacement of the beam in the y-direction, μ is the mass per unit length of the cantilever, and $f_h(x, t)$ is the hydrodynamic force. This equation represents the balance of forces on the cantilever when brought into motion. The sum of the restoring force due to the beam stiffness and the inertial force of the cantilever is equal to the force exerted by the fluid. This force due to the fluid is known as the hydrodynamic force and incorporates the effect of the additional inertia of the fluid and its viscosity for unsteady (or oscillatory) boundary flow. Equ. (2) can be solved using the boundary conditions for a beam of length, L, clamped at one end, $$u(0,t) = u_s(t), \frac{\partial u(0,t)}{\partial x} = 0 \quad (3)$$

and, $$\frac{\partial^2 u(L,t)}{\partial^2 x} = 0, \frac{\partial^3 u(L,t)}{\partial^3 x} = 0 \quad (4)$$

where $u_s(x, t)$ is the displacement of the support. It is convenient to transform Equ. (2) into the frequency domain to analyze steady-state behavior such that, $$EI\frac{\partial^4 U(x|\omega)}{\partial x^4} + \mu\frac{\partial^2 U(x|\omega)}{\partial t^2} = F_h(x|\omega) \quad (5)$$

where U(x|ω) represents the Fourier transform of u(x, t). Assuming harmonic motion of the form, $u(x, t) = u_0(x) \exp(i\omega t)$, then Equ. (5) becomes, $$EI\frac{\partial^4 U(x|\omega)}{\partial x^4} - \mu\omega^2 U(x|\omega) = F_h(x|\omega) \quad (6)$$

The hydrodynamic force is given by, $$F_h(x|\omega) = \mu'\Gamma(\omega)\omega^2 Y(x|\omega) \quad (7)$$

where μ' is the added mass per unit length due to the fluid and Γ(ω) is the geometry dependent hydrodynamic function and in general is complex. The term μ'Γ(ω) is known as the virtual mass of the fluid.

Consider first the case where the cantilever is brought into motion by applying a displacement to the support. The device will measure the relative displacement between the support and the beam (i.e. the beam shape), which is given by, $$W(x|\omega) = U(x|\omega) - U_s(\omega).$$

Substituting Equ. (7) into Equ. (6) and expressing in terms of the beam shape, W(x|ω), yields, $$EI\frac{\partial^4 W(x|\omega)}{\partial x^4} - (\mu + \mu'\Gamma(\omega))\omega^2 W(x|\omega) = F_{dr-sm}(\omega) \quad (8)$$

where the general form of the driving force due to support motion, $F_{dr-sm}(\omega)$, is given by, $$F_{dr-sm}(\omega) = (\mu + \mu'\Gamma(\omega))\omega^2 U_s(\omega). \quad (9)$$

The hydrodynamic force has added the virtual mass term to the inertial term on the lhs of Equ. (8). This acts to shift the resonant frequency and adds damping due to the fluid viscosity. The virtual mass is also added to the driving force causing it to be enhanced, compared with its magnitude in a vacuum (i.e. where μ'=0). Equ. (8) represents the equation of motion for a fluid loaded cantilever subject to support motion.

An alternative means of actuating the cantilever is by fluid motion. This can be implemented by exciting an acoustic wave in the fluid and corresponds to the relevant transduction mechanism for the present sensor. In this case $U_s = 0$ (i.e., the support motion is zero) and an additional term, $F_{dr-fm}(\omega)$, must be added to the rhs of Equ. (6) to account for this fluid motion. The equation of motion in this case is given by, $$EI\frac{\partial^4 W(x|\omega)}{\partial x^4} - (\mu - \mu'\Gamma(\omega))\omega^2 W(x|\omega) = F_{dr-fm}(\omega) \quad (10)$$

The general form of the driving force due to fluid motion is, $$F_{dr-fm}(\omega) = \mu'\Gamma(\omega)\omega^2 U_{fl}(\omega) \quad (11)$$

where $U_{fl}(\omega)$ is the displacement of the fluid in the absence of the cantilever. Typically, μ'Γ(ω) is much larger than μ and therefore the response under actuation by support motion, according to Equ. (9), will be similar to that under fluid motion when $U_s = U_{fl}$. Equ. (8) and (10) are similar in form to Equ. (11).

The driving force from a plane acoustic wave, which creates the pressure gradient parallel to the motion of the cantilever, can be derived from this result. A small volume element of fluid in an acoustic field experiences a force per unit length given by $$d\vec{f}(x,y,z) = -dA \cdot \nabla p(x,y,z),$$

where p is the acoustic pressure, $$\nabla = \partial/\partial x \cdot \vec{i} + \partial/\partial y \cdot \vec{j} + \partial/\partial z \cdot \vec{k}, \text{ and}$$

dA is the area across which the force acts. According to the linear inviscid force equation for small amplitude acoustic processes, the pressure gradient is also proportional to the fluid acceleration, $$\rho_{fl}\frac{\partial \dot{u}_{fl}}{\partial t} = -\nabla p \quad (12)$$

A plane wave traveling in the y-direction takes the form, $p = p_0 \exp(i(\omega t - ky))$, where k is the acoustic wavenumber ($k = \omega/c_{fl}$) and $c_{fl}$ is the sound speed in the fluid. Assuming the acoustic wavelength is much larger than the dimensions of the cantilever, then using Equ. (11), (12) and the relation, $df_y = -A_e \cdot \partial p/\partial y$, yields the Fourier transform of the force due to the fluid motion in terms of acoustic pressure, $$F_{dr-aco}(\omega) = -iA_e \cdot \Gamma(\omega) \cdot \frac{\omega}{c_{fl}} p_y \quad (13)$$

$A_e$ corresponds to the effective area over which to calculate the pressure gradient and is given by $\mu'/\rho_{fl}$.

Effect of Geometry

Thus far the analysis has not considered the geometry of the cantilever. This establishes the effective mass of the fluid and the form of the hydrodynamic function, Γ(ω). The effective mass of the fluid for the case of the planar cantilever and is given by, $$\mu'_{pl} = \rho_{fl}\pi b^2/4 \quad (14)$$

The effective mass of the fluid is equivalent to the mass of a fluid cylinder with a diameter equal to the width of the cantilever, b. The expression for the cylindrical cantilever is the same as the planar cantilever with b replaced with the outer diameter of the cylindrical cantilever, $2r_2$. This result suggests that a cylindrical region of fluid surrounding the cantilever is closely coupled to it and strongly influences its motion. This is also the region where the fluid motion is strongly perturbed by the cantilever motion. The expression (14) is widely used to predict the change in resonance frequency of a beam submerged in an inviscid fluid.

The hydrodymanic function incorporates the effect on the cantilever motion of the fluid viscosity and depends on the geometry of the cantilever. An analytical solution exists for the cylindrical cantilever and is given by.

$$\Gamma_{circ}(\omega) = 1 + \frac{4iK_1(-i\sqrt{i\mathrm{Re}})}{\sqrt{i\mathrm{Re}}\, K_0(-i\sqrt{i\mathrm{Re}})} \tag{15}$$

where $K_n$ are modified Bessel functions of the second kind. An analytical solution for the planar cantilever does not exist, however, an approximate solution can be derived by noting that the hydrodynamic function for the cylindrical and planar cantilever possess the same asymptotic form in the limits Re→0 and Re→∞. In the simulations that follow, this approximate expression is used for the hydrodynamic function for the planar cantilever. However, it should be noted that this approximate expression deviates from the exact expression for the cylindrical cantilever by less than 12% over the range $10^{-4}$<Re<$10^2$. Therefore, $\Gamma$ is similar for both cantilever geometries. For large Re, the imaginary part is negligible and $\Gamma$~1 corresponding to an inviscid fluid. When Re<<1 the imaginary part is much larger than the real part, which has interesting consequences for the driving force. The sensor behavior can be separated into three different operating regimes depending on the Reynolds number. These will now be examined in more detail.

Driving Force—High Re Regime

This regime occurs, according to Equ. (1), at high frequencies or when the cantilever dimensions increase, and represents small or negligible viscous effects. It is obtained when the prototype cantilevers described here are operated in air. In water, this regime is obtained when the cantilever cross section is larger than a few millimeters and is experienced by the planar cantilever described here. When viscous damping is small, the frequency response of the cantilever exhibits sharp peaks at each resonance and as a sensor is generally not suitable for operation above the fundamental resonance. If the cantilever were driven by an acoustic wave propagating in air, the driving force generated by an particle motion, according to Equ. (11), will be very small due to a small value of $\mu'$ yielding a very low response.

An alternative configuration for an acoustic sensor operating in a liquid is to place the cantilever in a sealed neutrally buoyant enclosure, which is submerged in the liquid. An acoustic wave propagating in the liquid induces motion of the support through the enclosure. The cantilever motion will be described by Equ. (8) and the force is given by, $$F_{dr-sm}(\omega)|_{high-Re} \cong \mu\omega^2 U_s(\omega) \tag{16}$$

The driving force is dependent on the mass of the beam, $\mu$. For a planar cantilever, this force is somewhat smaller than the force experienced by the cantilever when submerged in a liquid and driven directly by the acoustic wave. In this case, the force is dependent on the effective mass of the surrounding water. This implies an added benefit of a directly driven cantilever.

Driving Force—Moderate Re Regime

When Re is less than ~10 the real part of $\Gamma(\omega)$ begins to increase. However, the imaginary part increases more rapidly and becomes equal to the real part when Re~1. In this regime, viscous damping is more significant but the driving force is predominantly due to fluid inertia. This regime is experienced by the cylindrical cantilever described here in water. The driving force due to fluid motion is given by Equ. (11) and can be approximated to, $$F_{dr-fin}(\omega)|_{mod-Re} \cong \mu' \cdot \mathrm{real}(\Gamma(\omega)) \cdot \omega^2 U_{fl}(\omega) \tag{17}$$

This force is in phase with the acceleration of the cantilever and is thus related to the acceleration of the fluid driven by the pressure gradient across the cantilever (i.e. parallel to its motion). The Fourier transform of the force due to the fluid motion in terms of acoustic pressure is, $$F_{dr-aco}(\omega)\Big|_{mod-Re} \simeq -iA_e \cdot \mathrm{real}(\Gamma(\omega)) \cdot \frac{\omega}{c_{fl}} p_y \tag{18}$$

In this regime, $\Gamma$ takes a value between 1 and 3.

Driving Force—Low Re Regime

When Re is less than 1, then real($\Gamma(\omega)$)<<imag($\Gamma(\omega)$). The driving force due to fluid motion is given by, $$F_{dr-fin}(\omega)|_{low-Re} \cong \mu' \cdot \mathrm{imag}(\Gamma(\omega)) \cdot \omega^2 U_{fl}(\omega) \tag{19}$$

Figure 2:
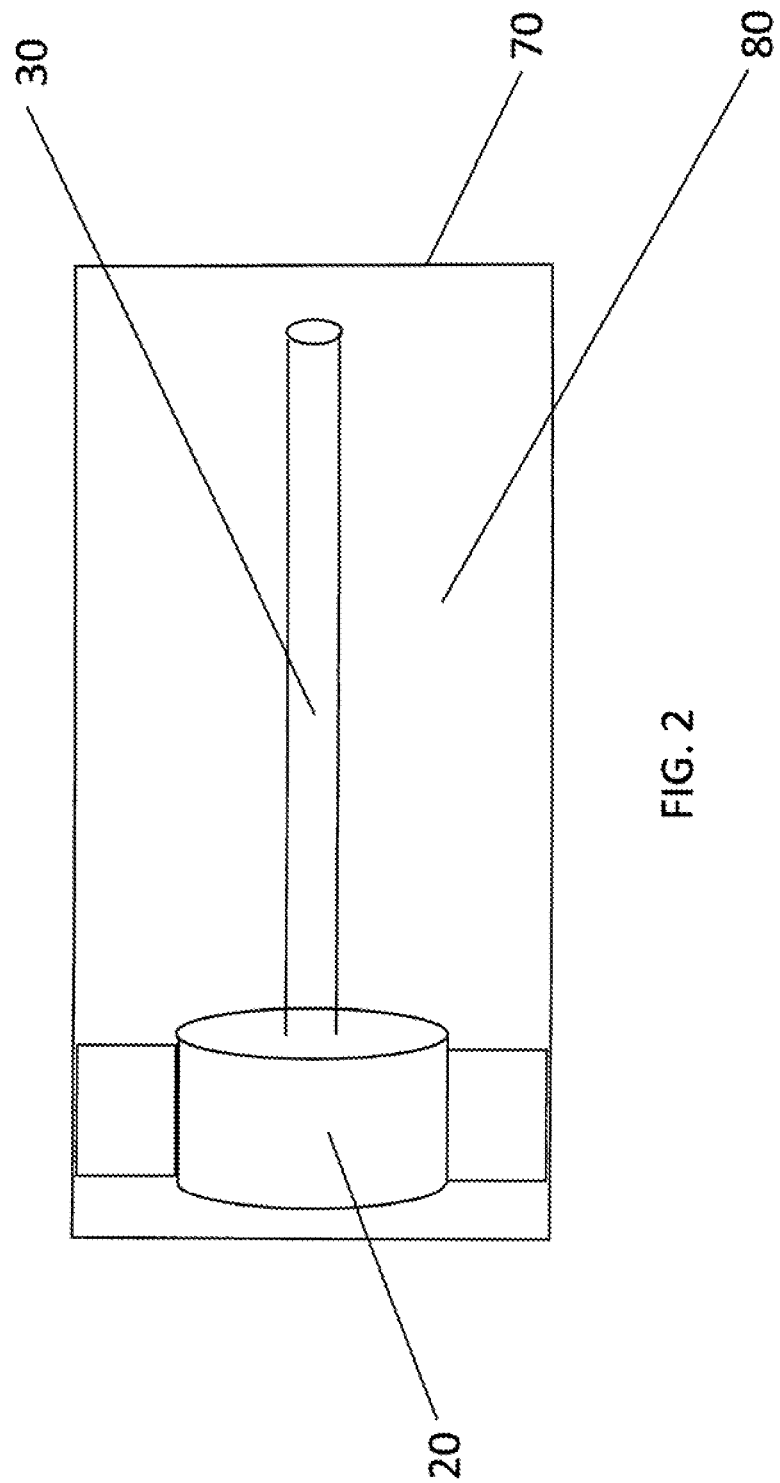
FIG. 2 is a section view of an embodiment of the instant invention, showing an illustrative placement of an illustrative membrane around one optical fiber.

The driving force is now dominated by the imaginary part of $\Box(\omega)$ and is in phase with the velocity of the cantilever. The cantilever motion in this regime is driven predominantly by the fluid viscosity. Referring to FIG. 2, the imaginary part of $\Box(\omega)$ increases rapidly with decreasing Re, approaching ~1000 for Re~$10^{-3}$. The magnitude of this force is very large compared with the other two regimes and therefore represents an interesting operating regime for a fluid motion sensor.

The Fourier transform of the force in terms of acoustic pressure is given by, $$F_{dr-aco}(\omega)\Big|_{low-Re} \simeq -iA_e \cdot imag(\Gamma(\omega)) \cdot \frac{\omega}{c_{fl}} p_y \tag{20}$$

Calculating the Beam Shape

The normalized beam shape is given by the analytical solution to the equation of motion, namely, Equ. (6) above. This solution is used along with the driving forces derived above to determine the beam deflections.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. An apparatus comprising:
    a rigid support;
    a first optical fiber penetrating said rigid support, said first optical fiber comprising a first neutral axis and at least one first wave-guiding core running parallel to the first neutral axis and located at a distance from the first neutral axis, each of the at least one first wave-guiding core comprising at least one first reflector,
    a first membrane surrounding said first optical fiber; and a first liquid inside the first membrane and surrounding said first optical fiber, said first liquid comprising a Reynolds number less than one.

2. The apparatus according to claim 1, further comprising a second optical fiber penetrating said rigid support, said second optical fiber being oriented perpendicular to said first optical fiber, said second optical fiber comprising a second neutral axis and at least one second wave-guiding core running parallel to the second neutral axis and located at a distance from the second neutral axis, each of the at least one second wave-guiding core comprising at least one second fiber Bragg grating.

3. The apparatus according to claim 2, further comprising a third optical fiber penetrating said rigid support, said third optical fiber being oriented perpendicular to said first optical fiber and parallel to said second optical fiber, said third optical fiber comprising a third neutral axis and at least one third wave-guiding core running parallel to the third neutral axis and located at a distance from the third neutral axis, each of the at least one third wave-guiding core comprising at least one third fiber Bragg grating.

4. The apparatus according to claim 2, wherein said first membrane surrounds said second optical fiber.

5. The apparatus according to claim 2, wherein said second optical fiber comprises one of an erbium-doped fiber, an ytterbium-doped fiber, a thulium-doped fiber, and a praseodymium-doped fiber.

6. The apparatus according to claim 2, further comprising:
a second membrane surrounding said second optical fiber; and
a second liquid inside the second membrane and surrounding said second optical fiber, said second liquid comprising a Reynolds number less than one.

7. The apparatus according to claim 3, further comprising:
a third membrane surrounding said third optical fiber; and
a third liquid inside the third membrane and surrounding said third optical fiber, said third liquid comprising a Reynolds number less than one.

8. The apparatus according to claim 3, wherein said first membrane surrounds said second optical fiber and said third optical fiber.

9. The apparatus according to claim 3, wherein said third optical fiber comprises one of an erbium-doped fiber, an ytterbium-doped fiber, a thulium-doped fiber, and a praseodymium-doped fiber.

10. The apparatus according to claim 3, wherein said first membrane surrounds said third optical fiber.

11. The apparatus according to claim 1, wherein said first optical fiber comprises one of an erbium-doped fiber, an ytterbium-doped fiber, a thulium-doped fiber, and a praseodymium-doped fiber.

12. The apparatus according to claim 1, wherein the at least one first wave-guiding core comprises one of one first wave-guiding core, two first wave-guiding cores, three first wave-guiding cores, and four first wave-guiding cores.

13. The apparatus according to claim 1, wherein said first optical fiber comprises a neutral plane, wherein said at least one first optical fiber comprises two first wave-guiding cores, one of the two first wave-guiding cores comprising a length lying in the neutral plane and the other of the two first wave-guiding cores comprising a length free of intersection with the neutral plane and lying parallel to the neutral plane.

14. The apparatus according to claim 1, wherein aid at least one first reflector comprises a fiber Bragg grating and a mirror,
wherein said fiber Bragg grating is located proximate to where said first optical fiber penetrates said rigid support and said mirror is located proximate to an end of said first optical fiber distal to said rigid support.

15. The apparatus according to claim 1, wherein said at least one first reflector comprises a fiber Bragg grating, and a thin film reflector,
wherein said fiber Bragg grating is located proximate to where said first optical fiber penetrates said rigid support and said thin film reflector is located proximate to an end of said first optical fiber distal to said rigid support.

16. The apparatus according to claim 1, wherein said at least one first reflector comprises a first fiber Bragg grating, and a second fiber Bragg grating,
wherein said first fiber Bragg grating is located proximate to where said first optical fiber penetrates said rigid support and said second fiber Bragg grating is located proximate to at end of said first optical fiber distal to said rigid support.

\* \* \* \* \*